March 19, 1968  G. F. N. OLIVER  3,373,859

INTERMITTENT POWER TAKEOFF DEVICES

Filed Oct. 17, 1966

INVENTOR
G. F. N. OLIVER
BY
Holcombe, Wetherill & Brisebois
ATTORNEY

3,373,859
INTERMITTENT POWER TAKEOFF DEVICES
George F. N. Oliver, Bean, near Dartford, Kent, England, assignor to Oliver Pell Control Limited
Filed Oct. 17, 1966, Ser. No. 587,251
7 Claims. (Cl. 197—17)

ABSTRACT OF THE DISCLOSURE

In intermittently operated power-driven mechanism in which the drive is obtained by bringing a rotatably mounted cam into frictional engagement with a continuously driven roller, the cam is frictionally coupled to a circular disc which is rotatable about the same axis as the cam and is normally in engagement with the roller, so that the disc is rotated and tends to rotate the cam, the latter being normally held against rotation by a withdrawable detent. With this construction it can be arranged that the peripheral speed of the cam is already substantially equal to the peripheral speed of the roller at the moment when the two come into frictional engagement, thereby preventing wear and shock loading of the parts. The mechanism is suitable for operating the type bars of power driven typewriters and is described in its application to such machines.

---

Figure 1:
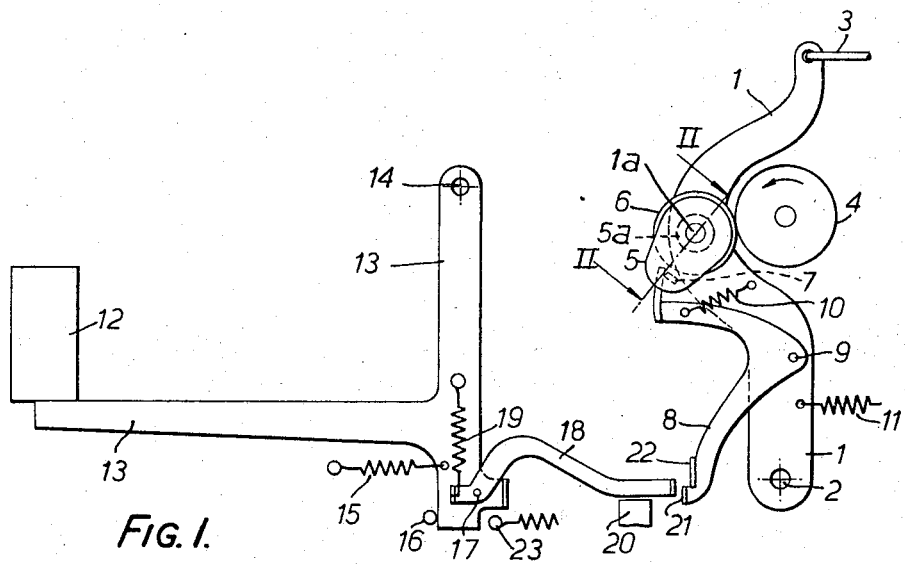

Many forms of mechanical device are known whereby a continuously driven member, such as a continuously rotating roller, can intermittently, upon command, be coupled to a second member, so that power derived from the continuously driven member can be used to operate a mechanism which is to be driven only intermittently.

One such device is used in power driven typewriting machines, where the force required to move a type bar is taken off from a continuously rotating power-driven roller by a cam, pivotally mounted upon an arm linked to the type bar. The cam is normally stationary in such a position that a minor radius is directed towards the rotating roller and the cam-carrying arm is in such a position that the cam is just clear of the roller. Depression of the appropriate key lever of the typewriter causes rotation of the cam upon its pivot, so that the rising contour of the cam is brought into engagement with the surface of the continuously rotating roller. Once engagement has been effected, the cam is frictionally driven by the roller, this continued rotation of the cam causing movement of the cam-carrying arm, which through suitable linkages operates the type bar and causes its type head to strike the paper. Continued rotation of the cam returns the cam and the arm on which it is carried to their starting positions, the cam being retained in this position by a suitable detent until the appropriate key is again depressed, when the operations described are repeated.

In such a system, the surface speed of the cam (which is stationary prior to its initial partial rotation in response to movement of the key lever) will not in general be the same as the surface speed of the continuously driven roller at the moment when the two are forced into contact. The cam is then violently accelerated by sliding friction with the power-driven roller and the wear resulting from this friction and the shock loading imposed upon the parts leads to unsatisfactory operation after a relatively short working life.

The present invention comprises intermittently operated power driven mechanism in which a rotary cam, rotation of which causes operation of the mechanism to be driven, can be brought into frictional driving engagement with a continuously driven roller, and in wihch the cam is frictionally coupled to a circular disc rotatable about the same axis as the cam, the disc being normally in engagement with the continuously driven roller, so that the disc rotates and tends to rotate the cam, the latter being normally held against rotation by a withdrawable detent. With this construction it can be arranged that the cam does not come into engagement with the roller until the cam has been so accelerated by its frictional coupling to the disc that its peripheral speed is substantially equal to the peripheral speed of the roller, thereby avoiding the wear and shock loading referred to above.

Figure 2:
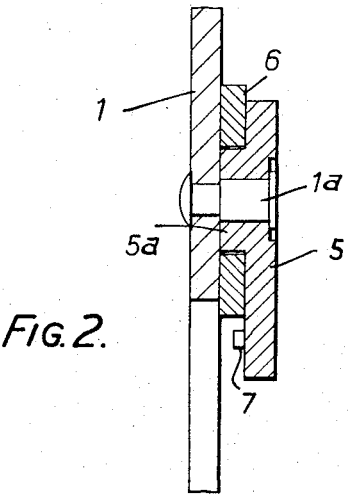

Additional features of the invention will sufficiently appear from the appended claims when read in the light of the following description of the particular form of mechanism in accordance with the invention which is illustrated in the accompanying drawing. In the drawing:

FIGURE 1 shows a mechanism in accordance with the invention for operating one of the type bars of a power driven typewriting machine; and FIGURE 2 shows a detail of this mechanism on a larger scale, the figure representing a section on the line II—II of FIGURE 1.

The mechanism illustrated comprises an arm 1, whose lower end is pivotally supported at 2, while its upper end is connected to a link 3 for operating the type bar. The arm 1 is mounted adjacent a power-driven roller 4, which rotates continuously (counter-clockwise in FIGURE 1). The arm 1 carries a laterally projecting pivot pin 1a, on which there is rotatably mounted a cam 5. The cam is formed with a laterally projecting bearing boss 5a, concentric with the pivot pin, this boss rotatably supporting a circular annular disc 6, whose radius is intermediate the minimum and maximum radii of the cam. The cam is normally held stationary with a minor radius directed towards the roller 4 by the engagement with a stop 7 on the cam of a detent formed on a trigger 8, the trigger being pivoted to the arm at 9 and urged into stop-engaging position by a spring 10. The arm 1 is urged towards roller 4 by a spring 11, so that the part of disc 6 projecting beyond the periphery of the cam is pressed into engagement with the roller surface and the disc is continuously rotated about its bearing boss.

By reason of the friction existing between the disc and the bearing boss, this continuous rotation of the disc tends to rotate the cam also, such rotation being resisted by the friction between the cam and the pivot pin upon which it is mounted. If there was no contact between the side faces of the members 1, 5 and 6, or if these surfaces were frictionless, the net frictional force tending to rotate the cam when the parts are in the normal position described would depend solely upon the radial force applied to the two bearings by the spring loading and the difference between the diameters of their respective circles of friction, which are in turn dependent upon the diameters of the bearings and the nature of the materials of which the parts are made. It is arranged that the circle of friction of the ring bearing is larger than that of the pivot bearing, so that as a result of the radially applied force alone (ignoring friction between the rubbing faces) there is a net frictional force tending to rotate the cam. Some rubbing friction between the side faces of parts 1, 5 and 6 is inevitable in practice, but with the construction illustrated the net effect of such incidental friction is to increase the tendency for the cam to rotate.

The cam is normally held against such rotation by the engagement of the detent on the trigger 8 with the stop 7 on the cam. When the trigger 8 is turned (counter-clockwise in FIGURE 1) to withdraw the detent from the path of stop 7, the net torque acting on the cam causes the latter to commence rotating in the same direction as the continuously rotating disc 6, i.e., clockwise in FIGURE 1. Since the cam is out of contact with the power-driven roller and is otherwise unloaded, it rapidly acquires the speed of the disc and rotates with the latter. The cam is so shaped that it is not until equality of peripheral speed has been achieved, that the periphery of the cam comes into engagement with the roller, so that at the moment of engagement the cam and roller have the same surface speeds and there is no shock or sliding friction upon engagement. The cam having thus engaged the roller surface, the cam continues to be driven by its own frictional coupling with the roller. Such continued rotation of the cam causes the arm 1 to turn counter-clockwise about its pivot 2, thereby pulling upon the link 3 to operate the type bar. The cam continues to be driven directly by the roller so long as the part of its contour directed towards the roller projects beyond the periphery of the circular disc 6. Thereafter, the cam is disengaged from the power roller 4 and it continues to rotate solely under the influence of the difference of friction previously described until the parts have been returned to their starting positions, when the detent re-engages and holds the cam stationary upon its pivot until the key lever is again operated.

As will be apparent from FIGURE 2, the cam 5 and disc 6 may be constituted by quite thin plates, stampings or mouldings, so that the power take off mechanism described occupies only a very small space measured axially of the power-driven roller. A large number of such mechanisms can thus be accommodated side by side for selective operation by the roller.

The re-engagement of the detent with the stop on the cam when the latter has completed one revolution is ensured by the construction of the means provided for operating the trigger. These means comprise a key 12 carried on a lever 13, which is pivotally supported at 14 and is urged by a spring 15 against a fixed stop 16. Pivoted at 17 to the key lever is a push link 18, which is urged by a spring 19 against a stop 20. In this position of the push link, its end lies opposite the lower working face 21 of trigger 8, the trigger being also formed with an upper working face 22. Depression of key 12 sufficiently to bring lever 13 against a stop 23 causes the push link to operate the trigger and move it clear of the path of stop 7, so that cam 5 rotates and operates the type bar as already described. If key 12 is immediately released, the trigger returns to stop-engaging position under the influence of spring 10, ready to arrest the cam after it has made one complete revolution. If, however, key 12 is held down, the movement (counter-clockwise in FIGURE 1) of arm 1 caused by engagement of the rising contour of the cam with the power roller causes the lower working face 21 of the trigger to move beneath the end of push link 18, whereupon spring 10 returns the trigger to stop-engaging position. If, when the falling contour of the cam engages roller 4 and arm 1 returns clockwise towards the position illustrated, key 12 is still depressed, the lower working surface 21 of the trigger lifts the adjacent end of link 18, the trigger remaining in stop-engaging position. Subsequent release of key 12, allows the link to drop back onto stop 20.

To allow a single depression of key 12 to cause repeated operation of the type bar, when desired, stop 23 limiting the movement of key lever 13 is spring mounted, so that it can be displaced to permit a more extended excursion of the key lever when greater pressure is applied to key 12. If this extended movement is given to key lever 13 and push link 18, then when the lower working face 21 of the trigger moves beneath the push link, the end of the push link engages the upper working face 22 and continues to hold the trigger clear of the path of stop 7, even after the link has been lifted by the return movement of arm 1. The cam accordingly continues to rotate, causing repeated operation of the type bar, until key 12 is released. Ordinarily this facility for effecting repeated operation of the type bar in response to a single depression of the key will be provided on only a few of the keys of the typewriter, the stops 23 for the remaining keys being fixed in position.

The mechanism illustrated may be employed in a typewriter constructed in accordance with the provisional specification of our co-pending patent application, No. 36,792 of 1965, the push link 18 constituting the link referred to in that specification which is displayed to disconnect the key lever from the trigger when the typewriter is lowered onto a special base. The base is provided with an upwardly projecting member adapted to engage and lift stop 20 (which is common to the push links of all the keys), thus lifting the push link so that its end no longer lies opposite the working faces of trigger 8 and mechanically disconnecting these two parts. The end of push link 18 then lies opposite a sensing member in the base, while one of the working faces of trigger 8 lies opposite an operating member in the base, with the results and for the purposes described in the said provisional specification No. 36,792/65.

While the invention has, for convenience been described in its application to power-driven typewriting machines, it may be employed also in any other devices in which mechanism is to be driven intermittently by power derived from a continuously driven member. It may, for example, be employed to effect the operation of electric switches in process controllers, or the like. Equally, the invention is not limited to the particular form of mechanism described above, this description being intended by way of illustrative example only.

What is claimed is:

1. Intermittently operated power-drive mechanism in which a rotary cam, rotation of which causes operation of the mechanism to be driven, can be brought into frictional driving engagement with a continuously driven roller, and in which the cam is frictionally coupled to a circular disc rotatably supported upon a bearing boss projecting laterally from the cam, the boss being concentric with and of larger diameter than the pivot on which the cam is rotatably supported, the friction between the circular disc and the projecting cam boss being greater than that between the cam bearing and its pivot, the disc being normally in engagement with the continuously driven roller, so that the disc rotates and tends to rotate the cam, the latter being normally held against rotation by a withdrawable detent.

2. Mechanism in accordance with claim 1, in which the friction at the bearing between the disc and the cam boss resulting from radially applied force alone is greater than the friction at the bearing between the cam and its pivot resulting from such force.

3. Mechanism in accordance with claim 1, in which the cam is mounted on a moveable member, coupled to the mechanism to be driven, rotation of the cam causing displacement of the moveable member and the operation of the mechanism.

4. Mechanism in accordance with claim 3, in which the withdrawable detent is operated by a trigger mounted on the said moveable member and operation of a manual key moves a push link against a face of the trigger to effect withdrawal of the detent and permit rotation of the cam, the resultant movement of the moveable member carrying the said face of the trigger clear of the push link, so that the detent will re-engage the cam after it has completed one revolution even if the key remains operated.

5. Mechanism in accordance with claim 4, in which the trigger has a second face which is engaged by the push link when the first face is carried clear of the push link, provided that the manually operated key has been given an additional displacement, thereby permitting continued rotation of the cam so long as the key is held so additionally displaced.

6. Intermittently operated power-driven mechanism comprising a continuously driven roller, a cam mounted for rotation about an axis parallel to but spaced from the axis of said roller, the periphery of said cam being normally spaced from the surface of said roller, a circular disc mounted for rotation about the same axis as said cam and frictionally coupled to said cam, the periphery of said disc being normally in frictional engagement with the surface of said roller so that said disc is rotated by said roller and tends to rotate said cam, a detent normally holding said cam against rotation, control means operable to withdraw said detent whereby to permit said cam to rotate to bring its periphery into frictional engagement with the surface of said roller, and means responsive to rotation of said cam for operating the mechanism to be driven.

7. Mechanism in accordance with claim 6, in which said cam is rotatably supported upon a pivot carried by a movable member coupled to the mechanism to be driven and said disc is rotatably supported upon a bearing boss projecting laterally from said cam, said boss being concentric with and of larger diameter than said pivot.

References Cited

UNITED STATES PATENTS

| | | | |
|---|---|---|---|
| 2,119,928 | 6/1938 | Salzberger | 197—17 |
| 2,728,435 | 12/1955 | Kupper | 197—17 |
| 2,825,440 | 3/1958 | Bauder et al. | 197—17 |
| 2,902,131 | 9/1959 | Ascoli et al. | 197—17 |
| 3,001,625 | 9/1961 | Cetras et al. | 197—17 |
| 3,021,935 | 2/1962 | Walter et al. | 197—17 |

ROVERT E. PULFREY, *Primary Examiner.*

E. S. BURR, *Examiner.*